(12) United States Patent
De Jesus

(10) Patent No.: US 10,399,459 B1
(45) Date of Patent: *Sep. 3, 2019

(54) VEHICLE WHEEL GENERATOR SYSTEM

(71) Applicant: Roberto De Jesus, San Juan, PR (US)

(72) Inventor: Roberto De Jesus, San Juan, PR (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/976,922

(22) Filed: May 11, 2018

Related U.S. Application Data

(63) Continuation-in-part of application No. 15/687,519, filed on Aug. 27, 2017, now Pat. No. 9,973,059.

(51) Int. Cl.
| | | |
|---|---|---|
| *H02K 7/00* | (2006.01) |
| *B60L 50/90* | (2019.01) |
| *B60K 7/00* | (2006.01) |
| *H02K 7/18* | (2006.01) |
| *H02K 11/00* | (2016.01) |
| *B60L 50/50* | (2019.01) |

(52) U.S. Cl.
CPC ............ *B60L 50/90* (2019.02); *B60K 7/0007* (2013.01); *B60L 50/50* (2019.02); *H02K 7/006* (2013.01); *H02K 7/1846* (2013.01); *H02K 11/0094* (2013.01); *B60L 2200/12* (2013.01); *B60L 2220/44* (2013.01)

(58) Field of Classification Search
CPC ...... H02K 7/1846; H02K 7/006; H02K 21/24; H02K 11/046
USPC .................... 310/67 A, 67 R, 75 C
See application file for complete search history.

(56) References Cited

U.S. PATENT DOCUMENTS 9,973,059 B1 * 5/2018 De Jesus ................ H02K 7/006

* cited by examiner

*Primary Examiner* — Thanh Lam
(74) *Attorney, Agent, or Firm* — Luis Figarella

(57) ABSTRACT

An energy recovery system for a machine, and particularly a multi-wheeled vehicle, includes an energy generation component housed within one or more of said wheel assemblies, coupled to an energy storage component which selectively receives energy from said vehicle motion effect on said energy generation component(s) and delivers said energy to a said energy storage component. In one embodiment, said energy generation is an electric generator, and said storage component is an electric battery.

5 Claims, 5 Drawing Sheets

VEHICLE WHEEL GENERATOR SYSTEM

CROSS-REFERENCE TO RELATED APPLICATIONS

This application claims priority as a Continuation-In-Part of pending U.S. patent application Ser. No. 15/687,519 titled "Vehicle Wheel Generator System", filed on Aug. 27, 2017 the disclosure of which is herein incorporated by reference in its entirety.

PATENTS CITED

The following documents and references are incorporated by reference in their entirety, Gill (U.S. Pat. No. 4,479,356) and Erslton et al (US Pat. Pub. No. 2008/0078631).

FIELD OF THE INVENTION

The present invention relates to an energy recovery system for use in conjunction with a multi-wheeled vehicle, and particularly to a motor vehicle energy generation component housed within one of said wheel assemblies, coupled to an electric energy storage component which selectively receives energy from said vehicle motion effect on said energy generation component and delivers said energy to a said energy storage component.

DESCRIPTION OF THE RELATED ART

While moving, many vehicles (including electric vehicles and/or those equipped with electric storage capacity components such as batteries) waste the option of generating energy from the motion of their non-drive wheels. This energy may be generated while they are coasting, going downhill and/or even going uphill. What is needed, is a solution that can collect this 'extra' energy and deposit it within the electric energy storage components of said vehicle.

SUMMARY OF THE INVENTION

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

In one aspect the invention is about a wheeled vehicle apparatus comprising two or more wheels assemblies, said assemblies comprised of one or more energy generating wheel assemblies, and one or more drive wheel assemblies, one or more electric energy storage component, one or more electric energy generators, each said generator mechanically linked to at least one said generating wheel assembly, one or more electric motors, each said motor being mechanically linked to at least one said drive wheel and an electric control and distribution system connecting and controlling said one or more motors, said one or more generators and said one or more energy storage components. In another aspect, each said generator is completely housed within one said generating wheel assembly. In yet another aspect, said generator is housed within the tire rim. In another aspect, each said motor is completely housed within one said drive wheel assembly. In yet another aspect, said motor is housed within the tire rim.

Other features and advantages of the present invention will become apparent upon examining the following detailed description of an embodiment thereof, taken in conjunction with the attached drawings.

Figure 1:
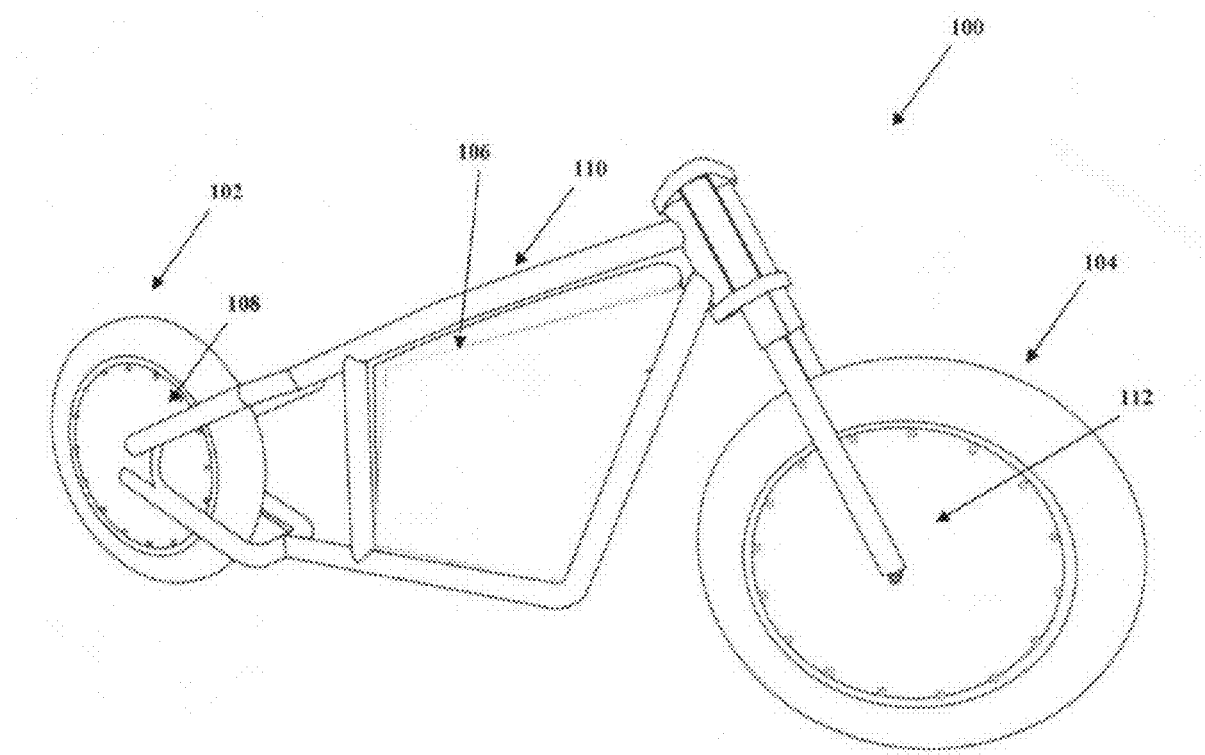
FIG. 1 shows an illustration of a proposed multi-wheeled vehicle, according to an exemplary embodiment of the invention.

The above-described and other features will be appreciated and understood by those skilled in the art from the following detailed description, drawings, and appended claims.

DETAILED DESCRIPTION OF THE PREFERRED EMBODIMENT

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

To provide an overall understanding of the invention, certain illustrative embodiments and examples will now be described. However, it will be understood by one of ordinary skill in the art that the same or equivalent functions and sequences may be accomplished by different embodiments that are also intended to be encompassed within the spirit and scope of the disclosure. The compositions, apparatuses, systems and/or methods described herein may be adapted and modified as is appropriate for the application being addressed and that those described herein may be employed in other suitable applications, and that such other additions and modifications will not depart from the scope hereof.

Simplifications or omissions may be made to avoid obscuring the purpose of the section. Such simplifications or omissions are not intended to limit the scope of the present invention. All references, including any patents or patent applications cited in this specification are hereby incorporated by reference. No admission is made that any reference constitutes prior art. The discussion of the references states what their authors assert, and the applicants reserve the right to challenge the accuracy and pertinence of the cited documents. It will be clearly understood that, although a number of prior art publications are referred to herein, this reference does not constitute an admission that any of these documents form part of the common general knowledge in the art.

As used in the specification and claims, the singular forms "a", "an" and "the" include plural references unless the context clearly dictates otherwise. For example, the term "a transaction" may include a plurality of transaction unless the context clearly dictates otherwise. As used in the specification and claims, singular names or types referenced include variations within the family of said name unless the context clearly dictates otherwise.

Certain terminology is used in the following description for convenience only and is not limiting. The words "lower," "upper," "bottom," "top," "front," "back," "left," "right" and "sides" designate directions in the drawings to which reference is made, but are not limiting with respect to the orientation in which the modules or any assembly of them may be used.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

Referring to FIG. 1 we see that in one embodiment, the proposed system is comprised by a multi-wheeled vehicle 100 (in this case a motorcycle, although any wheeled vehicle, including cars, tractor trailers, trucks, trains, etc. may be used) having a drive wheel assembly 102, an energy generating wheel assembly 104 and an electric energy storage component 106. Both the drive wheel assembly 102 and energy storage component 106 may be housed at one or more points within the vehicle wheel rim 108 and/or vehicle frame 110, and electrically connected to each other. Similarly, the energy storage component 106 may be connected to the generating assembly 104.

The electric energy storage component may be comprised of one or more combinations of the following, conventional lithium ion battery technologies and/or any of the four major battery technologies now represented: Solid state, aluminum ion, lithium sulfur, metal-air, as well as any similar chemical energy storage and/or other energy storage components.

Figure 2:
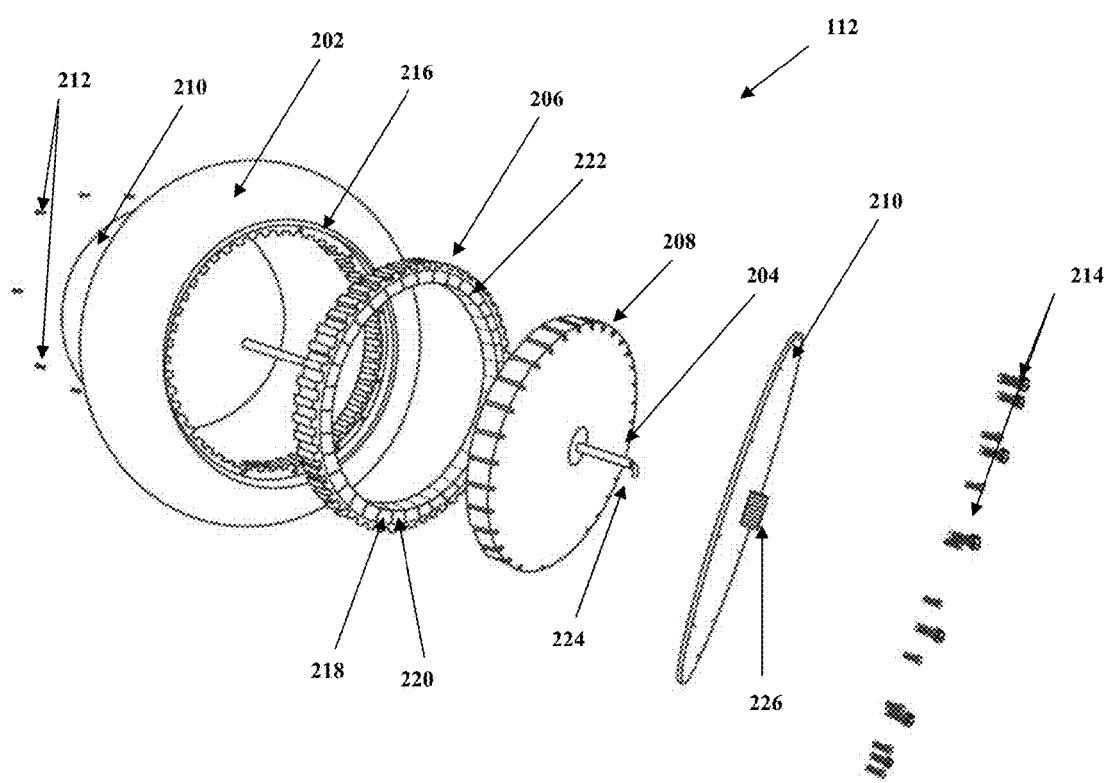
FIG. 2 shows the internal components of the energy generating wheel, according to an exemplary embodiment of the invention.
Figure 3:
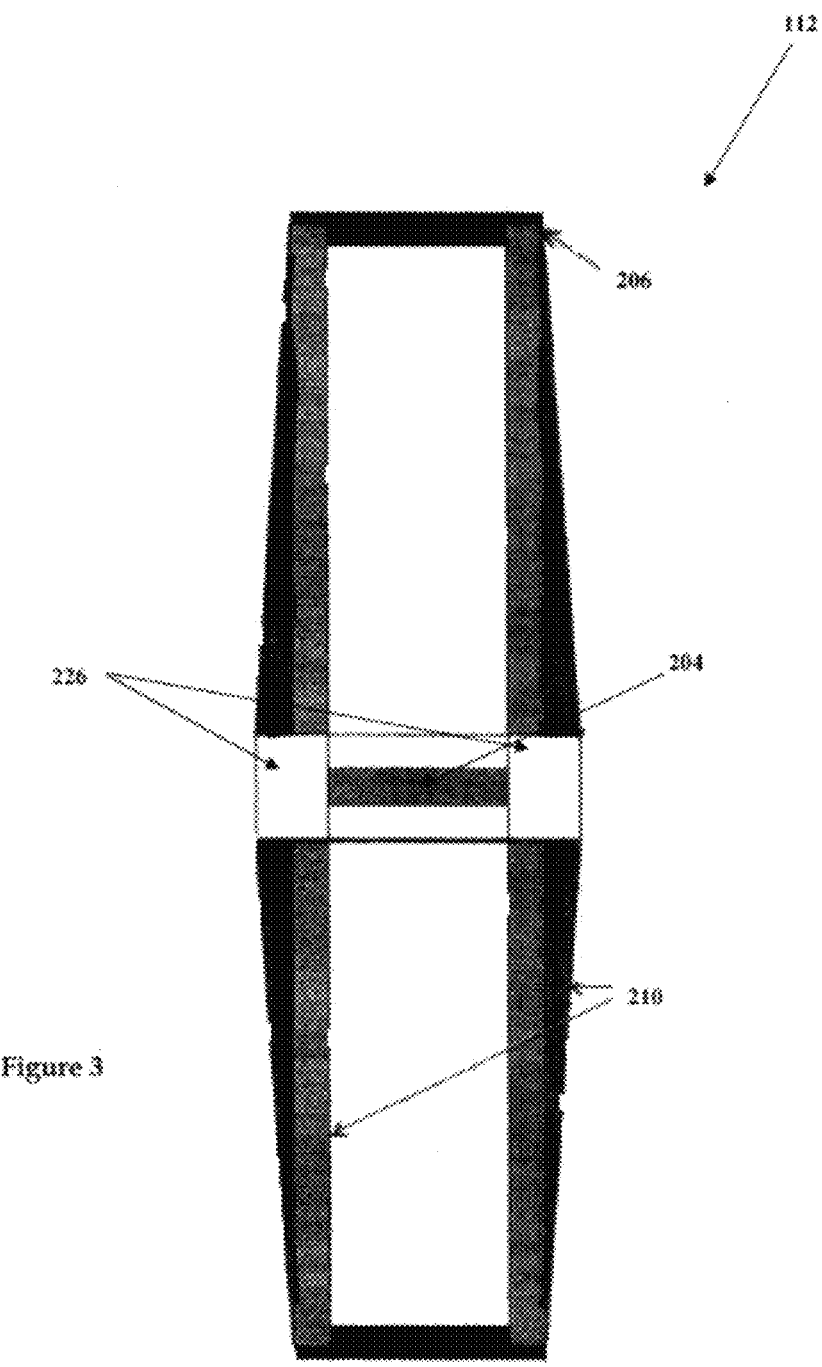
FIG. 3 shows a front view of the energy generating wheel, according to an exemplary embodiment of the invention.

In one embodiment, the energy generating wheel assembly 104 is comprised of a electric generation components 112 located within the non-driving wheel assembly 104 (FIG. 1). Within said assembly 104 we see an axle 204 (FIG. 2) around which a tire 202 (solid, inflatable, hybrid) has a rim 216 (preferable metal (aluminum, magnesium, steel) and/or composite formed of plastic, carbon fiber, etc.)) with mechanical components (gears, notches) to couple said rim 216 to the interface inner rim 206. This inner rim 206 has complementary mechanical components on its outside (to match those on the rim 216) and inner magnetic field material ring 222 comprised of alternating N-pole 218, and S-pole 220 permanent magnets located along the inner perimeter.

Inside the ring 222 is a generating wheel 208 comprised of one or more metal windings (be they ferrous or non-ferrous metals) which when rotated past the ring 222 permanent magnets 218/220 generated electricity. This wheel 208 remains fixed while the tire assembly 202/216/206/222 rotates around it, generating electricity with its motion. An advantage of such an assembly, is that simple wires 224 take the generated energy out to the battery 106. Optional covers 210 are used to keep the operating portion completely enclosed and prevent dirt/rocks from damaging it. The units are secured to one another with one or more sets of screws/nuts/bolts 212/214. Note the ball bearings assemblies 226 allowing rotation around the fixed shaft 204.

In operation, the drive wheel assembly 102 (FIG. 1) uses the energy from the energy component 106 to move the vehicle. The rotation of the energy generating wheel assembly 104 allows for the battery to be recharged constantly, through the energy generated in the generating assembly 104. Note the vehicle may have one or more drive wheels and one or more generating wheels, either mounted on the same axis, and/or in separate axles.

The invention allows a vehicle larger energy autonomy, for in addition to the on-board energy storage component, the wheel generation is engaged 100% of the time the vehicle moves, allowing the generation of energy, something not found in other vehicles to date. Thus in one embodiment, the energy generating assembly 104 is always on.

Figure 4:
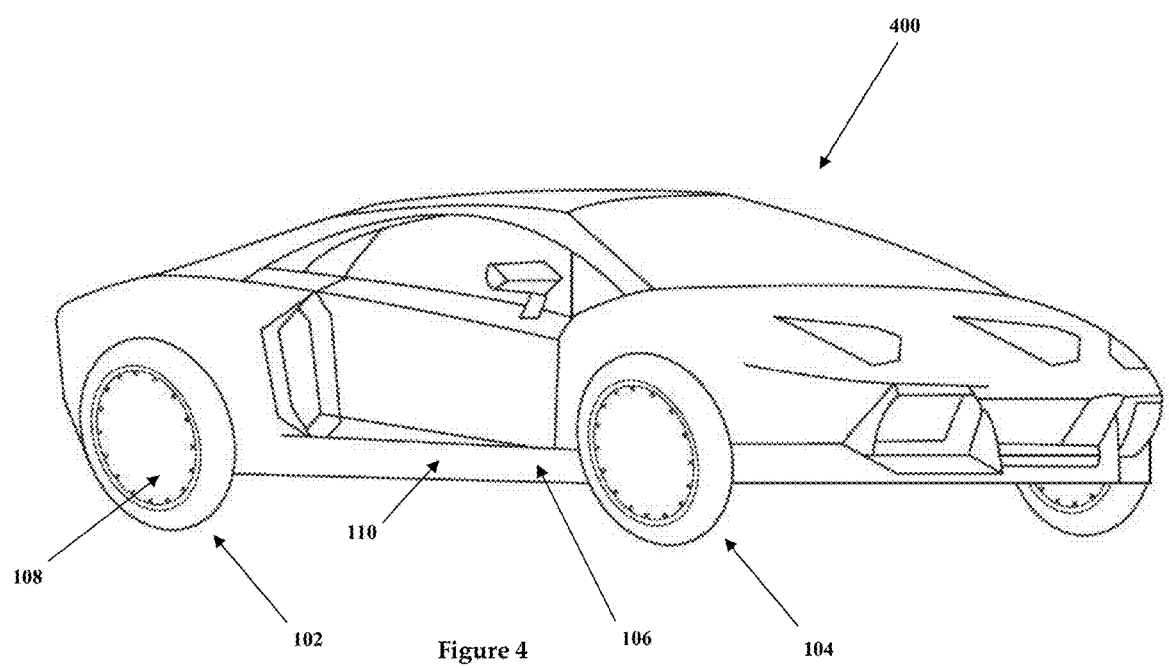
FIG. 4 shows an illustration of a proposed multi-wheeled vehicle, according to an exemplary embodiment of the invention.

Referring to FIG. 4 we see a four wheel vehicle 400 having one or more drive wheel assemblies 102, one or more energy generating wheel assemblies 104 and an electric energy storage component 106 which may be located at one or more locations within the vehicle, including within all or parts of the base of the vehicle, trunk, front, under seats, etc.

Both the drive wheel assemblies 102 and energy storage component 106 may be housed at one or more points within the vehicle wheel rim 108 and/or vehicle frame 110, and electrically connected to each other. Similarly, the energy storage component 106 may be connected to the generating assembly 104. An electronic control and distribution system connecting and controlling said one or more energy generating wheel assemblies 104 to said one or more drive wheel assemblies 102 and said electric energy storage components 106 would make the system work.

Figure 5:
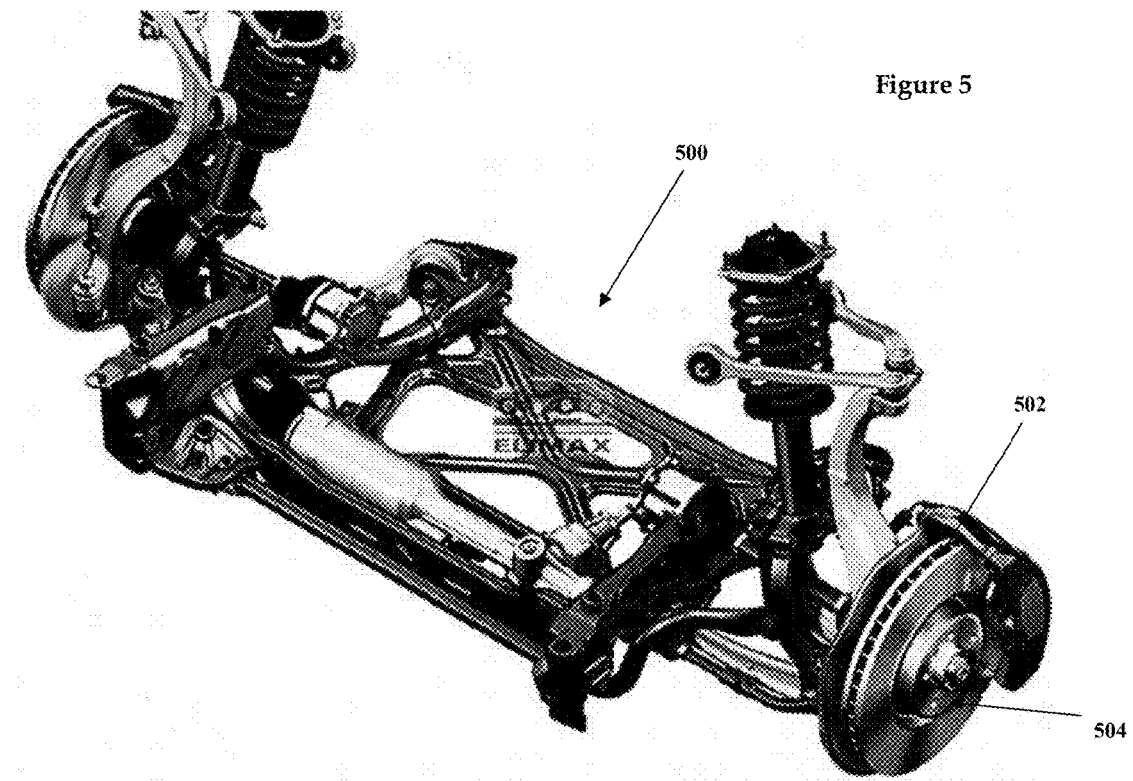
FIG. 5 shows an axle assembly, according to an exemplary embodiment of the invention.
Figure 6:
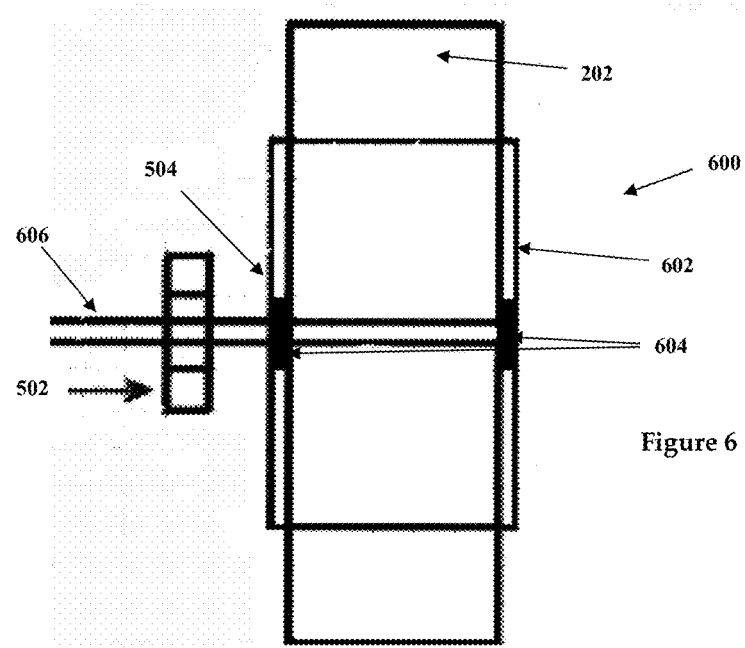
FIG. 6 shows an illustration of a proposed vehicle installation implementation, according to an exemplary embodiment of the invention.

FIGS. 5-6 illustrate an alternative embodiment of the invention, particularly suited to a passively stable vehicle, such as a tri-wheeler (or more), those where a spatial plane is held relatively stable to the ground while not in motion without assistive technology. In a vehicle axle 500 (front or back), the more common disk brakes 502 are placed at the end of the wheel axle, and traditional tire is attached to the studs 504 at said axle end (in simple cases the axle extends across the body chassis width, in others, an imaginary axle exists between the wheels across the chassis, this is so the tires don't fight each other). As seen in 600, it may be possible to place a self-contained drive wheel assembly 102 and/or an energy generating wheel assembly 104 (collectively 602) within the tire 202 assembly, connected to the vehicle control electronics, with ancillary bearings 604 linking to the suspension axle 606.

CONCLUSION

In concluding the detailed description, it should be noted that it would be obvious to those skilled in the art that many variations and modifications can be made to the preferred embodiment without substantially departing from the principles of the present invention. Also, such variations and modifications are intended to be included herein within the scope of the present invention as set forth in the appended claims. Further, in the claims hereafter, the structures, materials, acts and equivalents of all means or step-plus function elements are intended to include any structure, materials or acts for performing their cited functions.

It should be emphasized that the above-described embodiments of the present invention, particularly any "preferred embodiments" are merely possible examples of the implementations, merely set forth for a clear understanding of the principles of the invention. Any variations and modifications may be made to the above-described embodiments of the invention without departing substantially from the spirit of the principles of the invention. All such modifications and variations are intended to be included herein within the scope of the disclosure and present invention and protected by the following claims.

The present invention has been described in sufficient detail with a certain degree of particularity. The utilities thereof are appreciated by those skilled in the art. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the foregoing description of embodiments.

The invention claimed is:

1. A wheeled vehicle apparatus comprising;
two or more wheels assemblies, said assemblies comprised of one or more energy generating wheel assemblies, and one or more drive wheel assemblies;
one or more electric energy storage component;
one or more electric energy generators, each said generator being mechanically linked to at least one said generating wheel assembly;
one or more electric motors, each said motor being mechanically linked to at least one said drive wheel assembly; and
an electric control and distribution system connecting and controlling said one or more motors, said one or more generators and said one or more energy storage components.

2. The apparatus of claim 1 wherein;
each said generator is completely housed within one said generating wheel assembly.

3. The apparatus of claim 2 wherein;
each said generator is housed within the tire rim.

4. The apparatus of claim 1 wherein;
each said motor is completely housed within one said drive wheel assembly.

5. The apparatus of claim 4 wherein;
each said motor is housed within the tire rim.

* * * * *